(12) United States Patent
Kisilev et al.

(10) Patent No.: US 10,546,246 B2
(45) Date of Patent: Jan. 28, 2020

(54) ENHANCED KERNEL REPRESENTATION FOR PROCESSING MULTIMODAL DATA

(71) Applicant: International Business Machines Corporation, Armonk, NY (US)

(72) Inventors: Pavel Kisilev, Maalot (IL); Eli A. Meirom, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 14/857,859

(22) Filed: Sep. 18, 2015

(65) Prior Publication Data

US 2017/0083826 A1    Mar. 23, 2017

(51) Int. Cl.
*G06N 20/00*    (2019.01)

(52) U.S. Cl.
CPC .................... *G06N 20/00* (2019.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | |
|---|---|---|
| 7,542,953 B1 | 6/2009 | Syeda-Mahmood et al. |
| 8,463,053 B1 | 6/2013 | Guo et al. |
| 8,838,508 B2 | 9/2014 | Niculescu-Mizil et al. |
| 8,996,443 B2 | 3/2015 | Ebadollahi et al. |
| 9,536,208 B1 | 1/2017 | Kakde et al. |
| 2003/0041041 A1* | 2/2003 | Cristianini ............ G06K 9/6215 706/12 |
| 2007/0239642 A1* | 10/2007 | Sindhwani ............ G06K 9/6269 706/25 |
| 2009/0046951 A1* | 2/2009 | Paragios .................. G06K 9/32 382/294 |

(Continued)

OTHER PUBLICATIONS

Signoretto et al.—"Learning Tensors in Reproducing Kernel Hilbert Spaces with Multilinear Spectral Penalties"—2013—https://pdfs.semanticscholar.org/d5de/20cca347d6c5e6f662292e4d52e765ff5cee.pdf (Year: 2013).*

(Continued)

*Primary Examiner* — Scott A. Waldron
*Assistant Examiner* — Viker A Lamardo
(74) *Attorney, Agent, or Firm* — Aaron N. Pontikos

(57) ABSTRACT

A computer-implemented method includes receiving multimodal data. The computer-implemented method further includes generating one or more kernel matrices from the multimodal data. The computer-implemented method further includes generating an equivalent kernel matrix using one or more coefficient matrices, wherein the one or more coefficient matrices are constrained by a nuclear norm. The computer-implemented method further includes initiating one or more iterative processes. Each of the one or more iterative processes includes: calculating an error for the one or more coefficient matrices of the equivalent kernel matrix based on a training set, and initiating a line search for the one or more coefficient matrices of the equivalent kernel matrix. The computer-implemented method further includes, responsive to generating an optimal coefficient matrix, terminating the one or more iterative processes. The method may be embodied in a corresponding computer system or computer program product.

14 Claims, 6 Drawing Sheets

(56) References Cited

U.S. PATENT DOCUMENTS

| | | | | |
|---|---|---|---|---|
| 2009/0132444 | A1* | 5/2009 | Liu | G06N 99/005 706/12 |
| 2009/0137924 | A1* | 5/2009 | Kapoor | A61B 5/04012 600/545 |
| 2009/0299996 | A1* | 12/2009 | Yu | G06F 17/30867 |
| 2010/0094784 | A1 | 4/2010 | Varma | |
| 2013/0191425 | A1* | 7/2013 | Porikli | G06K 9/6249 708/207 |
| 2013/0310093 | A1* | 11/2013 | Giannakis | H04W 24/02 455/501 |
| 2014/0279727 | A1* | 9/2014 | Baraniuk | G06N 99/005 706/11 |
| 2014/0343944 | A1 | 11/2014 | Benhaim et al. | |
| 2014/0358830 | A1 | 12/2014 | Chiang et al. | |
| 2015/0170055 | A1* | 6/2015 | Beymer | G06N 99/005 706/12 |
| 2015/0286874 | A1* | 10/2015 | Burghouts | G06K 9/4676 382/103 |
| 2015/0356704 | A1* | 12/2015 | Lipman | G06T 3/0093 703/1 |
| 2016/0284003 | A1* | 9/2016 | Renders | G06Q 30/0631 |

OTHER PUBLICATIONS

Marco Signoretto—"Kernels and Tensors for Structured Data"—2011—ftp://ftp.esat.kuleuven.ac.be/stadius/signoretto/Signoretto_PhD_thesis.pdf (Year: 2011).*
Tillmann Falck—"Nonlinear System Identification using Structured Kernel Based Models"—2013—http://homes.esat.kuleuven.be/~bdmdotbe/bdm2013/documents/13-124.pdf (Year: 2013).*
Zhu et al. (hereinafter Zhu) "P-packSVM: Parallel Primal grAdient desCent Kernel SVM"—2009—https://ieeexplore.ieee.org/stamp/stamp.jsp?tp=&arnumber=5360294 (Year: 2009).*
Bach et al., "Multiple Kernel Learning, Conic Duality, and the SMO Algorithm", Appearing in Proceedings of the 21st International Conference on Machine Learning, Banff, Canada, 2004, Copyright 2004 by the authors, 8 pages.
Candes et al., "The Power of Convex Relaxation: Near-Optimal Matrix Completion", Cornell University Library, arXov:0903.1476v1 [csIT] Mar. 9, 2009, 51 pages, <http;//arxiv.org/abs/0903.1476>.
Chang et al., "LIBSVM: A Library for Support Vector Machines", ACM Transactions on Intelligent Systems and Technology, vol. 2, No. 3, Article 27, Publication date: Apr. 2011, 27 pages.
Chapelle et al., "Choosing Multiple Parameters for Support Vector Machines", Springer, Machine Learning, vol. 46, Issue 1, pp. 131-159, 2002, © 2002 Kluwer Academic Publishers, Manufactured in The Netherlands, <http://rd.springer.com/article/10.1023/A:1012450327387>.
Cortes et al, "Learning Non-Linear Combinations of Kernels", Machine Learning, Conference: Advances in Neural Information Processing Systems 22, 2009, Machine Learning Repository, pp. 1-9, <http://machinelearning.wustl.edu/mlpapers/papers/NIPS2009_0716>.
Cortes et al., "Two-Stage Learning Kernel Algorithms", New York University Computer Science, Appearing in Proceedings of the 27th International Conference on Machine Learning, Haifa, Israel, 2010, Copyright 2010 by the author(s)/owner(s), 10 pages, <http://www.cs.nyu.edu/~mohri/pub/align.pdf>.
Gonen et al., "Multiple Kernel Learning Algorithms", Journal of Machine Learning Research, vol. 12, 2011, Submitted Dec. 2009; Revised Sep. 2010; Published Jul. 2011, © 2011 Mehmet Gonen and Ethem Alpaydin, pp. 2211-2268, <http://dl.acm.org/citation.cfm?id=2021071>.
Hazan, Elad, "Sparse Approximate Solutions to Semidefinite Programs", IBM Almaden Research Center, 650 Harry Road, San Jose, 95120 CA, USA, E.S. Laber et al. (Eds.): LATIN 2008, LNCS 4957, 11 pages, 2008, © Springer-Verlag Berlin Heidelberg 2008, <http://rd.springer.com/chapter/10.1007%2F978-3-540-78773-0_27>.

Igel et al., "Gradient-Based Optimization of Kernel-Target Alignment for Sequence Kernels Applied to Bacterial Gene Start Detection", IEEE/ACM Transactions on Computational Biology and Bioinformatics, vol. 4, No. 2, Apr.-Jun. 2007, © 2007 IEEE, Published by the IEEE CS, CI, and EMB Societies & the ACM, pp. 216-226.
Jaggi et al., "A Simple Algorithm for Nuclear Norm Regularized Problems", Machine Learning, Appearing in Proceedings of the 27 th International Conference on Machine Learning, Haifa, Israel, 2010, Copyright 2010 by the author(s)/owner(s), 8 pages,<http://machinelearning.wustl.edu/mlpapers/paper_files/icml2010_JaggiS10.pdf>.
Jain et al., "SPG-GMKL: Generalized Multiple Kernel Learning with a Million Kernels", ACM, KDD'12, Aug. 12-16, 2012, Beijing, China, Copyright 2012 ACM, pp. 750-758.
Jing et al., "Semi-Supervised Low-Rank Mapping Learning for Multi-Label Classification", IEEE Conference on Computer Vision and Pattern Recognition (CVPR), Open Access Version, Boston, Jun. 7-12, 2015, pp. 1483-1491, <http://www.cv-foundation.org/openaccess/content_cvpr_2015/html/Jing_Semi-Supervised_Low-Rank_Mapping_2015_CVPR_paper.html>.
Koren et al., "Matrix Factorization Techniques for Recommender Systems", IEEE Computer Society, Aug. 2009, © 2009 IEEE, pp. 42-49.
Lanckriet et al., "Learning the Kernel Matrix with Semidefinite Programming", Journal of Machine Learning Research, vol. 5, 2004, Submitted Oct. 2002, Revised Aug. 2003, Published Jan. 2004, © 2004 Gert R.G. Lanckriet, Nello Cristianini, Peter Bartlett, Laurent El Ghaoui and Michael I. Jordan, 46 pages, <http://dl.acm.org/citation.cfm? d=1005332.1005334>.
Ma et al., "Fixed point and Bregman iterative methods for matrix rank minimization", Springer, Math. Program., Ser. A (2011) vol. 128, pp. 321-353, Published online: Sep. 23, 2009, DOI 10.1007/s10107-009-0306-5, © Springer and Mathematical Programming Society 2009.
Orabona et al., "Online-Batch Strongly Convex Multi Kernel Learning", Computer Vision and Pattern Recognition (CVPR), Jun. 13-18, 2010, pp. 787-794, © 2010 IEEE, DOI: 10.1109/CVPR.2010.5540137, <http://ieeexplore.ieee.org/xpl/articleDetails.jsp?arnumber=5540137&queryText=Online-Batch+Strongly+Convex+Multi+Kernel+Learning&newsearch=true&searchField=Search_All>.
Rakotomamonjy et al., "SimpleMKL", HAL archives-ouvertes, Journal of Machine Learning Research X, Microtome Publishing, 2008, 9, © 2008 Rakotomamonjy et al., pp. 1-34, <https://hal.archives-ouvertes.fr/hal-00218338v2>.
Recht et al., "Guaranteed Minimum-Rank Solutions of Linear Matrix Equations via Nuclear Norm Minimization*", MIT Open Access Articles, SIAM Review vol. 52, No. 3, 2010, pp. 471-501, © 2010 Society for Industrial and Applied Mathematics, <http://dspace.mit.edu/handle/1721.1/60575>.
Recht et al., "Parallel Stochastic Gradient Algorithms for Large-Scale Matrix Completion", Computer Sciences Department, University of Wisconsin-Madison, Apr. 2011; Last Revised Mar. 2013, pp. 1-27.
Rennie et al., "Fast Maximum Margin Matrix Factorization for Collaborative Prediction", Appearing in Proceedings of the 22nd International Conference on Machine Learning, Bonn, Germany, 2005, Copyright 2005 by author(s)/owner(s), pp. 713-719, <http://dl.acm.org/citation.cfm?id=1102441>.
Toh et al., "An accelerated proximal gradient algorithm for nuclear norm regularized linear least squares problems", Mar. 27, 2009, Revised, Nov. 11, 2009, pp. 1-31, <http://www.optimization-online.org/DB_FILE/2009/03/2268.pdf>.
Vishwanathan et al., "Multiple Kernel Learning and the SMO Algorithm", NIPS Proceedings, Part of: Advances in Neural Information Processing Systems 23 (NIPS 2010), pp. 1-9, © 1987—2015 Neural Information Processing Systems Foundation, Inc., <http://papers.nips.cc/paper/3985-multiple-kernel-learning-and-the-smo-algorithm>.
Xu et al., "Simple and Efficient Multiple Kernel Learning by Group Lasso", Machine Learning, Appearing in Proceedings of the 27th International Conference on Machine Learning, Haifa, Israel, 2010,

(56) References Cited

OTHER PUBLICATIONS

Copyright 2010 by the author(s)/owner(s), 8 pages, <http://machinelearning.wustl.edu/mlpapers/paper_files/icml2010_XuJYKL10.pdf>.
"Schur product theorem", from Wikipedia, the free encyclopedia, pp. 1-3, printed on Sep. 8, 2015, this page last modified on Aug. 29, 2015.

* cited by examiner

| Algorithm | Test Accuracy | Support Vector | Active Kernel | Calls to Solver |
|---|---|---|---|---|
| SVM (best) | 72.06 ±0.74 | 58.29 ±1.00 | 1.00 ±0.00 | 6 |
| SVM (all) | 79.13 ±0.45 | 62.14 ±1.04 | 6.00 ±0.00 | 1 |
| RBMKL (mean) | 78.01± 0.63 | 60.89± 1.02 | 6.00 ±0.00 | 1 |
| RBMKL (product) | 72.35 ±0.95 | 100.00 ±0.00 | 6.00 ±0.00 | 1 |
| ABMKL (conic) | 79.03 ±0.92 | 49.96 ±1.01 | 4.60 ±0.5 | 1 |
| ABMKL (convex) | 76.90 ±1.17 | 29.54 ±0.89 | 6.00 ±0.00 | 1 |
| ABMKL (ratio) | 78.06 ±0.62 | 56.95 ±1.07 | 6.00 ±0.00 | 1 |
| CABMKL (linear) | 79.51 ±0.78 | 49.81 ±0.82 | 5.97 ±0.18 | 1 |
| CABMKL (conic) | 79.28 ±0.97 | 49.84±0.77 | 4.73 ±0.52 | 1 |
| MKL | 76.38 ±1.19 | 29.65 ±1.02 | 6.00 ±0.00 | 1 |
| SimpleMKL | 76.34 ±1.24 | 29.62 ±1.08 | 6.00 ±0.00 | 18.83 ±4.27 |
| GMKL | 74.96 ±0.50 | 79.85 ±0.70 | 2.37 ±0.56 | 37.10 ±3.23 |
| GLMKL (p = 1) | 77.71 ±0.96 | 55.80 ±0.95 | 6.00 ±0.00 | 6.10 ±0.31 |
| GLMKL (p = 2) | 77.20 ±0.42 | 75.34 ±0.70 | 6.00 ±0.00 | 5.00 ±0.00 |
| NLMKL (p = 1) | 83.49 ±0.76 | 75.34 ±0.70 | 6.00 ±0.0 | 17.50 ±0.51 |
| NLMKL (p = 2) | 82.30±0.62 | 85.67 ± 0.86 | 6.00 ±0.00 | 13.40 ±4.41 |
| LMKL (softmax) | 81.91 ±.92 | 89.57 ±0.77 | 6.00 ±0.00 | 85.27±41.77 |
| LMKL (sigmoid) | 80.24 ±1.37a | 27.24 ±1.76 | 6.00± 0.00 | 103.90 ±62.69 |
| NuC-MKL | 85.2 ±0.42 | 36.61 ±0.99 | 6.00 ±0.0 | 9.13 ±1.69 |

FIG. 3

| Algorithm | Test Accuracy | Support Vector | Active Kernel | Calls to Solver |
|---|---|---|---|---|
| SVM (best) | 95.45 ±0.31 | 64.90 ±5.41 | 1.00 ±0.00 | 5.00 ±0.00 |
| SVM (all) | 96.43 ±0.24 | 41.99 ±1.76 | 5.00 ±0.00 | 1.00 ±0.00 |
| RBMKL (mean) | 96.53 ±0.58 | 34.40 ±4.25 | 5.00 ±0.00 | 1.00 ±0.00 |
| RBMKL (product) | 89.98 ±0.49 | 96.61 ±1.71 | 5.00 ±0.00 | 1.00 ±0.00 |
| ABMKL (conic) | 95.69 ±0.27 | 44.16 ±2.65 | 3.00 ±0.00 | 1.00 ±0.00 |
| ABMKL (convex) | 95.10 ±0.52 | 58.07 ±2.47 | 3.00 ±0.00 | 1.00 ±0.00 |
| ABMKL (ratio) | 96.23 ±0.61 | 35.07 ±2.92 | 5.00 ±0.00 | 1.00 ±0.00 |
| CABMKL (linear) | 95.86 ±0.19 | 36.43 ±1.50 | 5.00 ±0.00 | 1.00 ±0.00 |
| CABMKL (conic) | 95.84 ±0.19 | 38.06 ±2.36 | 4.40 ±0.52 | 1.00 ±0.00 |
| MKL | 96.32 ±0.50 | 35.82 ±4.35 | 4.10 ±0.32 | 1.00 ±0.00 |
| SimpleMKL | 96.37 ±0.46 | 33.78 ±4.40 | 4.60 ±0.52 | 27.00 ±7.39 |
| GMKL | 96.40 ±0.49 | 33.18 ±3.49 | 4.70 ±0.48 | 27.20 ±7.94 |
| GLMKL (p = 1) | 96.35 ±0.55 | 32.81 ±3.56 | 5.00 ±0.00 | 5.40 ±1.07 |
| GLMKL (p = 2) | 96.56 ±0.32 | 35.62 ±1.55 | 5.00 ±0.00 | 4.90 ±0.74 |
| NLMKL (p = 1) | 95.96 ±0.50 | 67.63 ±3.46 | 5.00 ±0.00 | 15.90 ±5.38 |
| NLMKL (p = 2) | 96.13 ±0.31 | 65.70 ±3.03 | 5.00 ±0.00 | 13.00 ±0.00 |
| LMKL (softmax) | 95.68 ±0.53 | 24.18 ±5.74 | 5.00 ±0.00 | 38.80 ±24.11 |
| LMKL (sigmoid) | 95.49 ±0.48 | 18.22 ±12.16 | 5.00 ±0.00 | 56.60 ±53.70 |
| NuC-MKL | 97.28 ±0.16 | 23.38 ±2.44 | 5.00 ±0.00 | 14.3 ±3.88 |

FIG. 4

| Categories | CNN-M128 | CNN-S | CNN-F | NuC-MKL(3) | NuC-MKL(6) |
|---|---|---|---|---|---|
| Aeroplane | 91.3 | 90.7 | 88.7 | 96.1 | 96.3 |
| Bicycle | 83.9 | 85.7 | 83.9 | 90.8 | 90.9 |
| Bird | 89.2 | 88.9 | 87 | 93.8 | 93.8 |
| Boat | 86.9 | 86.6 | 84.7 | 90.9 | 90.9 |
| Bottle | 52.1 | 50.5 | 46.9 | 52 | 53.2 |
| Bus | 81 | 80.1 | 77.5 | 86.2 | 84.8 |
| Car | 86.6 | 87.8 | 86.3 | 91.6 | 91.4 |
| Cat | 87.5 | 88.3 | 85.4 | 93.1 | 93.3 |
| Chair | 59.1 | 61.3 | 58.6 | 66.1 | 65.8 |
| Cow | 70 | 74.8 | 71 | 79.1 | 79.6 |
| Dining table | 72.9 | 74.7 | 72.6 | 76.9 | 77.3 |
| Dog | 84.6 | 87.2 | 82 | 91.6 | 91.7 |
| Horse | 86.7 | 89 | 87.9 | 93.5 | 93.7 |
| Motorbike | 83.6 | 83.7 | 80.7 | 88.4 | 88.9 |
| Person | 89.4 | 92.3 | 91.8 | 95.1 | 95.4 |
| Plant | 57 | 58.8 | 58.5 | 59.4 | 59.3 |
| Sheep | 81.5 | 80.5 | 77.4 | 85.4 | 85.3 |
| Sofa | 64.8 | 90.5 | 66.3 | 74.3 | 74 |
| Train | 90.4 | 74 | 89.1 | 96.8 | 96.7 |
| TV Monitor | 73.4 | 75.34 | 71.3 | 77.3 | 76.9 |
| mAP | 78.6 | 79.74 | 77.38 | 83.92 | 83.95 |

FIG. 5

ENHANCED KERNEL REPRESENTATION FOR PROCESSING MULTIMODAL DATA

BACKGROUND

The present invention relates generally to optimization methods and machine learning and in particular to implementation of Multiple Kernel Learning ("MKL") methods in support vector machines ("SVM").

Multiple Kernel Learning ("MKL") methods are used to solve classification and regression problems involving multimodal data and machine learning. In machine learning, support vector machines (SVM) are applied to analyze data and recognize patterns, used for classification and regression analysis. More specifically, the application of MKL methods in SVM's can be used to solve various real world problems, such as classification of images, classification of proteins, recognizing hand-written characters, and biometric identity recognition. Generally, MKL methods are applied in situations where the available data involves multiple, heterogeneous data sources. In this case, each kernel may represent the similarity between data points in different modalities. In many cases, a successful identification requires that the object will be similar in both (or all) feature representations. Therefore, a sum of products of kernels is ideal. However, finding the optimal parameters for the sum of products of kernels is a high dimensional optimization problem, as the number of parameters is quadratic in the number of kernels. As a result, the increase in the number of parameters may result in the risk of overfitting data.

SUMMARY

A computer-implemented method includes receiving multimodal data. The computer-implemented method further includes generating one or more kernel matrices from the multimodal data. The computer-implemented method further includes generating an equivalent kernel matrix using one or more coefficient matrices, wherein the one or more coefficient matrices are constrained by a nuclear norm. The computer-implemented method further includes initiating one or more iterative processes. Each of the one or more iterative processes includes: calculating an error for the one or more coefficient matrices of the equivalent kernel matrix based on a training set, and initiating a line search for the one or more coefficient matrices of the equivalent kernel matrix. The computer-implemented method further includes, responsive to generating an optimal coefficient matrix, terminating the one or more iterative processes. The method may be embodied in a corresponding computer system or computer program product.

BRIEF DESCRIPTION OF THE DRAWINGS

FIG. 3 is a table depicting the performances of single-kernel SVM's and representative MKL classification methods on a Protein Folding Prediction data base in accordance with at least one embodiment of the invention.

FIG. 4 is a table depicting the performances of single-kernel SVM's and representative MKL classification methods on an Internet Advertisement database in accordance with at least one embodiment of the invention.

FIG. 5 is a table depicting the performances of single-kernel SVM's and representative MKL classification methods on a Deep Neural Networks database in accordance with at least one embodiment of the invention.

DETAILED DESCRIPTION

Figure 1:
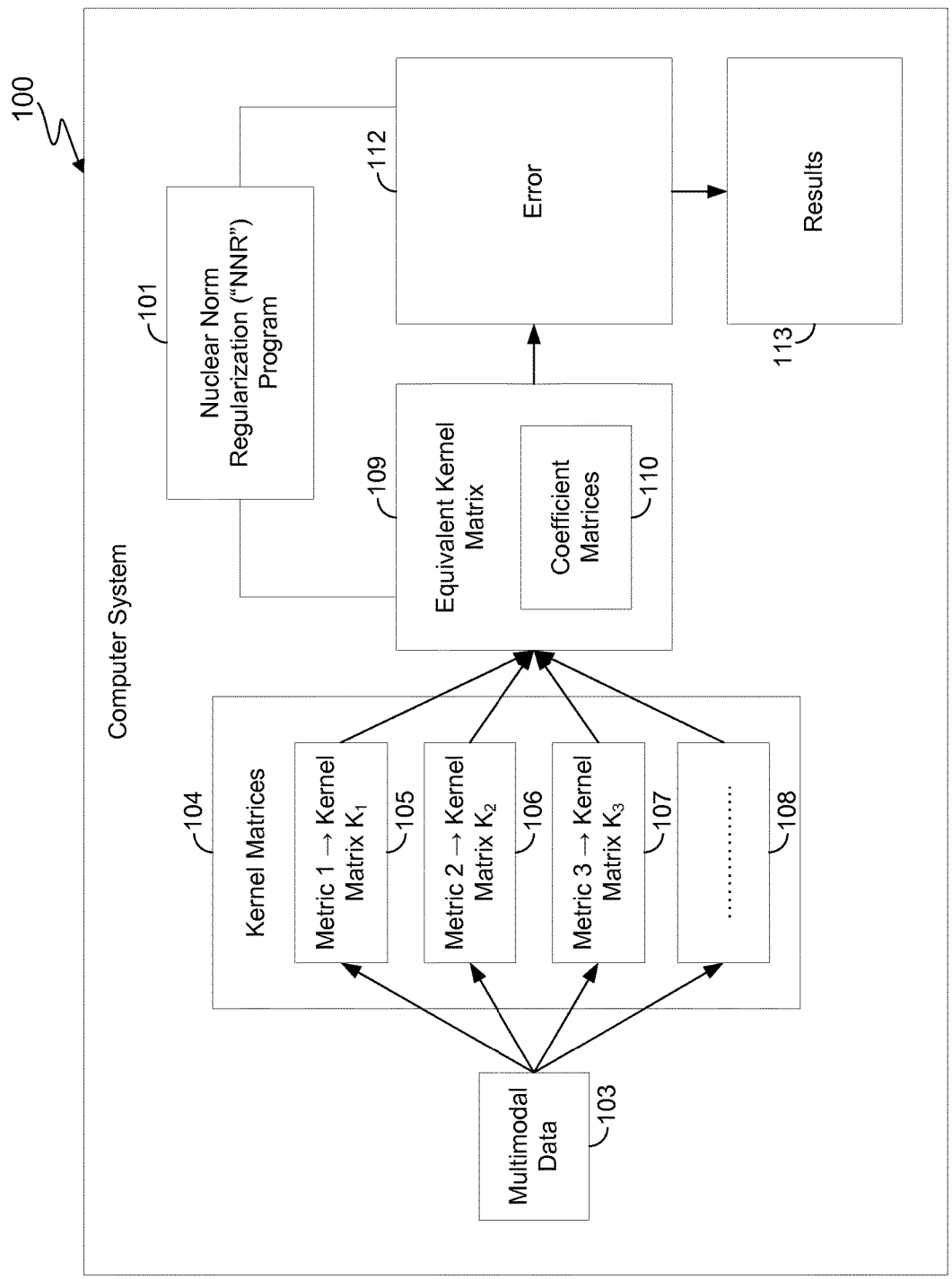
FIG. 1 is a block diagram of one embodiment of a computer system environment suitable for operation in accordance with at least one embodiment of the invention.

Referring now to various embodiments of the invention in more detail, FIG. 1 is a block diagram of one embodiment of a computer system environment suitable for operation in accordance with at least one embodiment of the invention. Within a computer system 100, a nuclear norm regularization ("NNR") program 101 may receive multimodal data 103. For example, the multimodal data 103 may be audio or visual images, protein or genetic structures, or hand-written characters. The NNR program 101 may further generate one or more kernel matrices 104 from the multimodal data 103. More specifically, the one or more kernel matrices 104 may be generated based on a distance metric. For example, the kernel matrices 104 may include a kernel matrix 105, kernel matrix 106, kernel matrix 107, and kernel matrix 108. Each kernel matrix 105-108 may be formed using a different distance metric.

The NNR program 101 may further generate an equivalent kernel matrix 109 using one or more coefficient matrices 110. More specifically, the equivalent kernel matrix 109 may be a linear sum of products of the one or more kernel matrices 104 and one or more coefficients. The one or more coefficient matrices 110 may further be constrained by a nuclear norm. For example, the nuclear norm of the one or more coefficient matrices 110 may be a value less than or equal to one.

The NNR program 101 may further initiate one or more iterative processes. Each of the one or more iterative processes may include calculating an error 112 for the one or more coefficient matrices 110 of the equivalent kernel matrix 109 based on a training set. More specifically, the error 112 may be calculated using SVM software. For example, calculating an error 112 for the one or more coefficient matrices 110 of the equivalent kernel matrix 109 may be accomplished using any standard SVM solvers or tools, such as a library for support vector machines ("LIBSVM"). The error 112 may be a separation measure of the training set and is a function of the one or more coefficient matrices 110 of the equivalent kernel matrix 109. For example, the error 112 may be a classification error or a regression error in an optimization problem. The function of the one or more coefficient matrices 110 of the equivalent kernel matrix 109 may be convex. Furthermore, calculating an error 112 may include Eigenvalue decomposition.

The NNR program 101 may further, for each iterative process, initiate a line search for the one or more coefficient matrices 110 of the equivalent kernel matrix 109. More specifically, the line search may include gradient descent. However, the line search may be accomplished by any generally known line search. For example, the line search may be Armijo's step rule or Jacobi-Davidson's step rule. The NNR program 101 may further, responsive to generating a result 113, terminate the one or more iterative processes. The result 113 may be an optimal coefficient matrix, where the error 112 for the one or more coefficient matrices 110 of the equivalent kernel matrix 109 has been satisfied.

Figure 2:
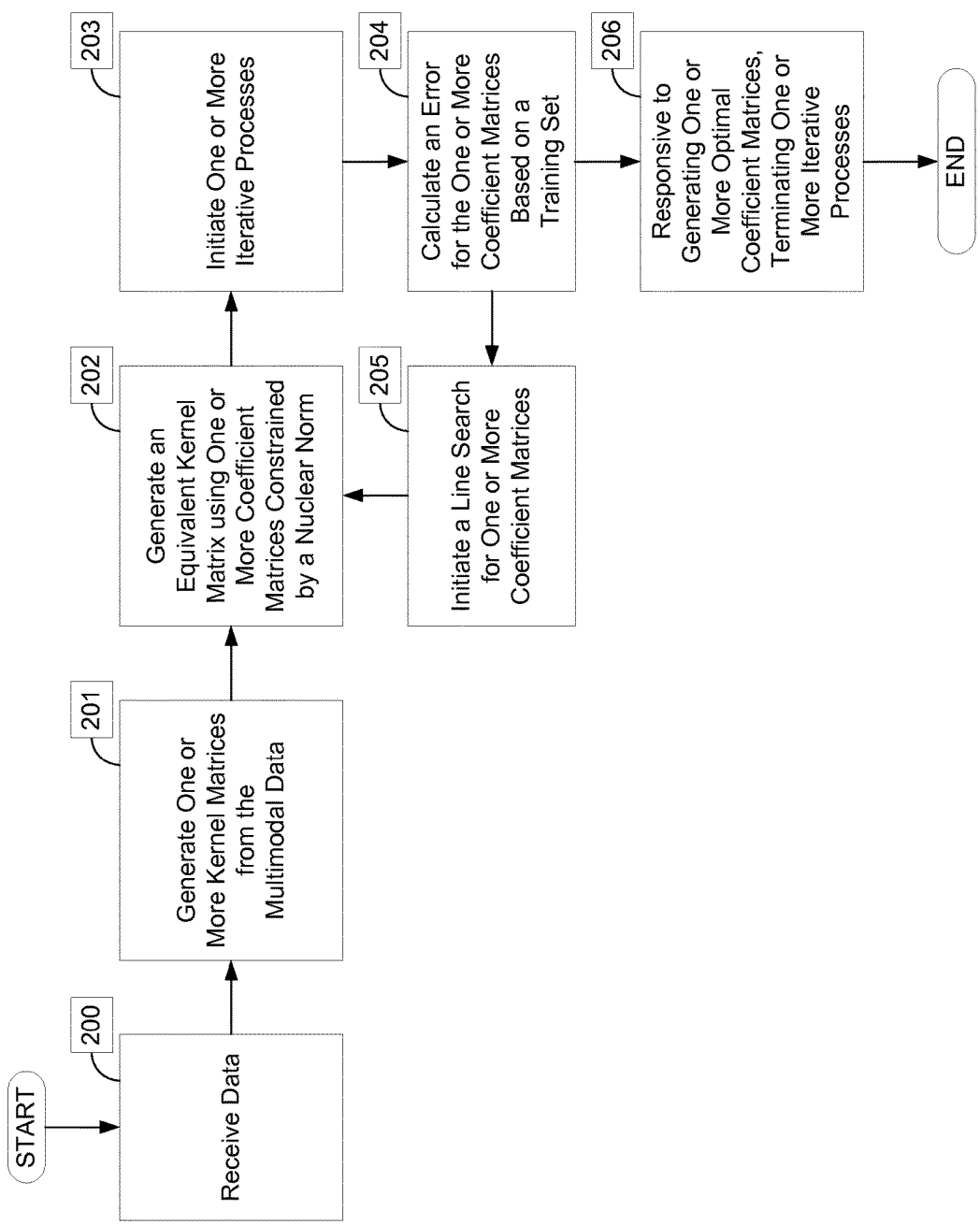
FIG. 2 is a flow chart diagram showing various operational steps of the nuclear norm regularization program according to at least one embodiment of the invention.

FIG. 2 is a flow chart diagram showing various operational steps of the NNR program 101 according to at least one embodiment of the invention. The present embodiments of the invention implement a NNR program 101 that utilizes a nuclear norm regularization term. It should be appreciated that by utilizing a nuclear norm regularization term, at least one embodiment of the invention may exist as a convex MKL optimization problem. Furthermore, in accordance with at least one embodiment of the invention, the NNR program 101 may be implemented in a regression task, classification task, or other machine learning applications.

The NNR program 101 will be explained in more detail below, however, in doing so, the framework of various embodiments of an optimization problem for an equivalent kernel matrix 109 in accordance with a classification task will be discussed first, followed by the implementation of the NNR program 101 within the classification task. In presenting the NNR program 101 in FIG. 2, a vector may be denoted by a bold letter v and a matrix by an underlined, bold capital letter, $\underline{A}$.

At step 200, the NNR program 101 may receive multimodal data 103. The multimodal data 103 may further include N data points $\{x_i\}$ and their corresponding labels $\{y_i\}$. At step 201, the NNR program 101 may generate one or more kernel matrices 104 from the multimodal data 103. Furthermore, there may exist m mappings $\phi_\beta(x_i)$, where each mapping may induce a kernel matrix 105-108:

$$\underline{K}_\beta(x_i, x_j) \triangleq \langle \phi_\beta(x_i), \phi_\beta(x_j) \rangle \quad \text{(Eq. 1)}$$

The tensor product of the mappings may be denoted as $$\phi_{\beta_1\beta_2}(x_i) \triangleq \phi_{\beta_1}(x_i) \otimes \phi_{\beta_2}(x_i) \quad \text{(Eq. 2)}$$

The kernel product may be defined as (Eq. 3)
$$\underline{K}^{\beta_1,\beta_2}(x_i, x_j) \triangleq \underline{K}^{\beta_1}(x_i, x_j)\underline{K}^{\beta_2}(x_i, x_j)$$
$$= \langle \phi_{\beta_1\beta_2}(x_i), \phi_{\beta_1\beta_2}(x_j) \rangle$$

where $\underline{K}^{\beta_1,\beta_2}$ is a positive definite matrix as an element-wise product of positive matrices.

A set of kernels may be written as a tensor $\kappa$, where the $\beta_1, \beta_2$ kernel is $K^{\beta_1\beta_2}$. The space of m×m matrices with positive elements may be denoted by $\mathbb{R}_+^{m \times m}$, and an element-wise inequality may be denoted by $\prec$.

At step 202, the NNR program 101 may generate an equivalent kernel matrix 109 using one or more coefficient matrices 110. More specifically, the equivalent kernel matrix 109 may be a linear sum of products of the one or more kernel matrices 104 and one or more coefficients. The one or more coefficient matrices 110 may further be constrained by a nuclear norm. For example, the nuclear norm of the one or more coefficient matrices 110 may be a value less than or equal to one.

In a first embodiment of the invention (1), an optimization problem for the equivalent kernel matrix 109 may be defined as:

(Eq. 5)
$$\min_{s} \sum_{\beta_1,\beta_2=1}^{m} \frac{\langle w_{\beta_1\beta_2}, w_{\beta_1\beta_2} \rangle}{2} + c\langle 1, \epsilon \rangle \quad (1)$$

w.r.t $$S = \{\{w_{\beta_1\beta_2} \mid w_{\beta_1\beta_2}\} = 1 \ldots m\},$$
$$\varepsilon \in \mathbb{R}^{N \times 1}, \underline{Z} \in \mathbb{R}_+^{m \times m}$$

s.t.

$$y_i\left(\sum_{\beta_1,\beta_2=1}^{m} \sqrt{Z_{\beta_1,\beta_2}} \langle w_{\beta_1\beta_2}, \phi_{\beta_1\beta_2}(x_i) \rangle + b\right) \geq 1 - \varepsilon$$

$$\varepsilon \geq 0, 0 < \|\underline{Z}\|_* \leq d, 0 \preceq \underline{Z}.$$

The set of optimization parameters $S$ may include $m^2$ vectors $\{w_{\beta_1\beta_2}\}$, representing the normals to separating hyper-planes according to the mapping $\phi_{\beta_1\beta_2}(\bullet)$, the vector of slack variables $\varepsilon \in \mathbb{R}^{N \times 1}$ and Z, a matrix with elements $Z_{\beta_1\beta_2}$, which weigh the relative contribution of the various mappings $\phi_{\beta_1\beta_2}(\bullet)$. For simplicity, it may be assumed that the slack variables are identical for all data points, such that $\varepsilon = \epsilon 1$, where $\epsilon \in \mathbb{R}$.

In a second embodiment of the invention (2), a convex optimization problem for the equivalent kernel matrix 109 may have one or more coefficient matrices 110 that are convex by the following transformation:

$$w'_{\beta_1\beta_2} = \sqrt{Z_{\beta_1,\beta_2}} w_{\beta_1\beta_2}. \quad \text{(Eq. 6)}$$

More specifically, the optimization problem for the equivalent kernel matrix 109 of the first embodiment (1) may be rewritten in terms of primed variables:

(Eq. 7)
$$\min_{s'} \sum_{\beta_1,\beta_2=1}^{m} \frac{\langle w'_{\beta_1\beta_2}, w'_{\beta_1\beta_2} \rangle}{2Z_{\beta_1\beta_2}} + c\langle 1, \epsilon \rangle \quad (2)$$

w.r.t $$S' = \{\{w'_{\beta_1\beta_2} \mid \beta_1\beta_2\} = 1 \ldots m\},$$
$$\varepsilon \in \mathbb{R}^{N \times 1}, \underline{Z} \in \mathbb{R}_+^{m \times m}$$

s.t.

$$y_i\left(\sum_{\beta_1,\beta_2=1}^{m} \langle w'_{\beta_1\beta_2}, \phi_{\beta_1\beta_2}(x_i) \rangle + b\right) \geq 1 - \epsilon \quad (2a)$$

$$\epsilon \geq 0, 0 < \|\underline{Z}\|_* \leq d, 0 \prec \underline{Z}.$$

In a third embodiment of the invention (3), by rescaling $Z'_{\beta_1\beta_2} \cdot d = Z_{\beta_1\beta_2}$, the convex optimization problem for the equivalent kernel matrix 109 of the second embodiment (2) may be rewritten as:

(Eq. 8)
$$\min_{s'} d\left(\sum_{\beta_1,\beta_2=1}^{m} \frac{\langle w'_{\beta_1\beta_2}, w'_{\beta_1\beta_2} \rangle}{2Z'_{\beta_1\beta_2}} + \frac{c}{d}\langle 1, \epsilon \rangle\right) \quad (3)$$

s.t.

-continued $$y_i\left(\sum_{\beta1,\beta2=1}^{m} \langle w'_{\beta_1\beta_2}, \phi_{\beta_1\beta_2}(x_i)\rangle + b\right) \geq 1 - \epsilon \quad (3a)$$

$$\epsilon \geq 0, 0 < \|\underline{Z}'\|_* \leq 1, 0 \prec \underline{Z}'.$$

The solution of the convex optimization problem for the equivalent kernel matrix 109 of the third embodiment (3) may be obtained at $\|\underline{Z}\|^*=1$, since, for any matrix $\underline{Z}$ where $\|\underline{Z}\|_*=x$, it is possible to substitute $\underline{Z}/x$ and obtain a strictly lower value without violating the constraint of (3a). More specifically, the solution may be obtained at the boundary of the feasible domain, $\|\underline{Z}\|^*=1$.

The minimum of the convex optimization problem for the equivalent kernel matrix 109 for the second embodiment (2) and third embodiment (3) may be obtained at the same point. Therefore, the second embodiment (2) of the invention is invariant under the transformation $c \leftarrow c/d$, $d \leftarrow 1$. In other words, there is effectively only a single free parameter in the second embodiment (2), and without loss of generality, d=1. This is particularly useful when the hyper-parameter c is optimized by a grid search, as it reduces dimension of the grid search from two to one.

In a fourth embodiment of the invention (4), the aforementioned second embodiment (2) and third embodiment (3) of the invention may be transformed into a convex optimization problem with dual variables for the equivalent kernel matrix 109. For a fixed coefficient matrix $\underline{Z}$, the convex optimization problem for the equivalent kernel matrix 109 may be denoted as $\underline{A} \in \mathbb{R}^{N \times N}$, where $\underline{A} = \underline{Z} \odot \kappa = \Sigma z_{\beta_1\beta_2} \underline{K}^{\beta_1\beta_2}$. Here, $\odot$ is the tensor contraction operator, and $\underline{A}$ is an n×n matrix. Following (Rakotomamonjy et al., 2008; Sun & Ampornpunt, 2010), the convex optimization problem for the equivalent kernel matrix 109 may be transformed to the dual variables of $\{w_{\beta_1\beta_2}|\beta_1\beta_2=1 \ldots m\}$ to obtain $$\min_{\underline{Z}} f(\underline{Z}) \quad (4)$$

subject to $0 < \|\underline{Z}\|^* \leq 1, 0 \leq \underline{Z}$ (Eq. 9)

where the function $f(\underline{Z})$ may be defined as:

(Eq. 10)

$$f(\underline{Z}) = \min_{\alpha} J(\alpha) = \langle 1, \alpha \rangle - \frac{1}{2}\langle \alpha, \underline{A}\alpha \rangle \quad (4a)$$

w.r.t
$\alpha \in \mathbb{R}^N$
s.t.
$\underline{A} = \underline{Z} \odot \kappa = \sum z_{\beta_1\beta_2} \underline{K}^{\beta_1\beta_2}$
$\sum \alpha_i y_i = 0$
$0 \leq \alpha \leq c1.$ The function $f(\underline{Z})$ as found in sub-embodiment (4a) must be differentiated by obtaining $\nabla f(\underline{Z})$. The stationary point of the equivalent kernel matrix 109 of sub-embodiment (4a) may be denoted by $\alpha^*$. At the stationary point $\alpha^*$, the derivative of the target function with respect to the sub-embodiment (4a) parameter $\underline{Z}$ may be:

(Eq. 11)

$$\frac{\partial J(\underline{Z})}{\partial z_{\beta_1\beta_2}} = \frac{\partial f(\alpha(\underline{Z})), \underline{A}(\underline{Z}))}{\partial z_{\beta_1\beta_2}}\bigg|_{\alpha(\underline{Z})=\alpha^*}$$

$$= -\frac{1}{2}\left\langle \alpha^*, \frac{\partial \underline{A}}{\partial z_{\beta_1\beta_2}}\right\rangle \alpha^*$$

$$= -\frac{1}{2}\langle \alpha^*, K^{\beta_1\beta_2}\alpha^* \rangle.$$

More specifically, at the stationary point $\alpha^*$, it is possible to differentiate the function $f(\alpha(\underline{Z}), \underline{A}(\underline{Z}))$ with respect to $z_{\beta_1\beta_2}$ as if $\alpha$ is independent of $\underline{Z}$.

At step 203, the NNR program 101 may initiate one or more iterative processes. At step 204, each of the one or more iterative processes may include calculating an error 112 for the one or more coefficient matrices 110 of the equivalent kernel matrix 109 based on a training set. More specifically, the error to be calculated may be a separation measure of the training set and is a function of the one or more coefficient matrices 110 of the equivalent kernel matrix 109. Furthermore, the function of the one or more coefficient matrices 110 of the equivalent kernel matrix 109 may be convex. The NNR program 101 may calculate an error 112 for the one or more coefficient matrices 110 of the equivalent kernel matrix 109 for one or more of the aforementioned embodiments of the invention. For example, the error 112 to be calculated may be a classification error or a regression error in accordance with the fourth embodiment (4) of the invention.

The NNR program 101 may calculate the error 112 through the use of an Artificial Intelligence ("AI") machine, such as SVM software. For example, the NNR program 101 may use any standard SVM solvers or tools, such as a library for support vector machines ("LIBSVM"). A SVM is a form of computer software that consists of supervised learning, wherein supervised learning is the machine learning task of analyzing data and recognizing patters, used for classification and regression analysis. Given a training set, each marked for belonging to one of two categories, an SVM solver intelligently builds a model that assigns new examples into one category or the other. For example, the NNR program 101 may implement SVM software to calculate an error 112 for one or more new examples, such as the one or more coefficient matrices 110 of the equivalent kernel matrix 109, based on a training set.

At step 205, each of the one or more iterative processes may include initiating a line search for the one or more coefficient matrices 110 of the equivalent kernel matrix 109. The line search may further include gradient descent. Here gradient-like steps are taken in the $\underline{Z}$ space. Since the optimal point $\underline{Z}^*$ is at the boundary, the line search may attempt to take a maximal step (s=1) towards the boundary. If this fails, the standard 1/m step size may be taken.

Referring to the aforementioned convex optimization problem for the equivalent kernel matrix 109 of the fourth embodiment (4), given a nuclear norm constrained task for a differentiable function $f(\underline{Z})$, the solution of (Eq. 11)

$$\min_{\|\underline{Z}\|_* \leq 1} f(\underline{Z})$$

is achieved by the following generalized Frank-Wolfe step (conditional gradient-like step):

$$\underline{Z}^{(n+1)} \leftarrow \underline{Z}^{(n)}(1-l) - luv^T. \quad \text{(Eq. 12)}$$

Here, l is the step size, while u and v are the vectors corresponding to the largest singular value of the $\nabla f(\underline{Z})$ matrix. More specifically, if $\nabla f(\underline{Z}) = \underline{USV}^T$ and the diagonal elements of $\underline{S}$ are in a decreasing order, then u (v) is the first column of $\underline{U}$ (respectively, $\underline{V}$). In particular, for a symmetric, positive definite matrix, both u and v are the corresponding eigenvectors of the largest eigenvalue of the $\nabla f(\underline{Z})$ matrix.

Still referring to the fourth embodiment (4) of the invention, $\|\underline{Z}\|^* = 1$. Since $\underline{Z}$ is symmetric, by writing $\underline{Z}$ in its spectral base, $$\underline{Z} \Sigma_i \lambda_i w_i w_i^T, \quad \text{(Eq. 13)}$$

where $w_i$ is the eigenvector corresponding to the i-th non-zero eigenvalue $\lambda_i$, $$\Sigma \lambda_i = 1. \quad \text{(Eq. 14)}$$

Specifically, the optimal stable solution is a fixed point of the gradient descent step $\underline{Z}^{(n+1)} \leftarrow \underline{Z}^{(n)}(1-l) - luv^T$. The optimal point $\underline{Z}^*$ may be a rank one matrix. More specifically, there may be only a single non-zero eigenvalue, $\lambda_1 = 1$ and $w_1 = u$. Here, it should be appreciated that the optimal point may be characterized by m parameters, which correspond to the entries of u, rather than $m^2$ parameters.

At step 206, responsive to generating a result 113, the one or more iterative processes may be terminated. The result 113 may be one or more optimal coefficient matrices for the equivalent kernel matrix 109.

FIGS. 3-6 depict the performances of single-kernel SVM and representative MKL classification methods on various data sets, including the classification method implementing the NNR program 101. Here, the results for various classification methods as obtained in (Gönen & Alpaydin, 2011) have been reproduced, and the results from the classification method implementing the NNR program 101 have been added for comparison. The Test Accuracy column represents the accuracy of the results. The Support Vector column represents the percentage of data points that were used as support vectors. The Active Kernel column represents the sum of the number of kernels used in the solution. Lastly, the Calls to Solver column represents the number of calls to the internal support vector machine (SVM) solver. All values are accompanied by their corresponding standard deviations.

In FIGS. 3-5, 16 MKL classification methods and two SVM classification methods were compared. The SVM's were trained on each feature representation separately and the one with the highest average validation accuracy is reported (SVM (best)). The SMV's were also trained on the concatenation of all feature representations (SVM (all)). The following are explanations of the various types of classification methods found within the data sets:

RBMKL denotes rule-based MKL classification methods. RBMKL (mean) trains an SVM with the mean of the combined kernels. RBMKL (product) trains an SVM with the product of the combined kernels.

ABMKL denotes alignment-based MKL classification methods. ABMKL (ratio) is described in (Qiu et al. (2009)), ABMKL (conic) is the classification methods of (Lanckriet et al. (2004)), and ABMKL (convex) solves the quadratic programming problem posed in (He et al. (2008)).

CABMKL denotes centered-alignment-based MKL classification methods, and both variations, CABMKL (linear) and CABMKL (conic) are presented in (Cortes et al. (2010)). SimpleMKL is the iterative classification method of (Rakotomamonjy et al. (2008)). GLMKL denotes the group Lasso-based MKL classification methods proposed in (Xu et al. (2010)). GLMKL (p=1) learns a convex combination of kernels while GLMKL (p=2) updates the kernel weights setting and learns a conic combination of the kernels. NLMKL denotes the nonlinear MKL classification method of (Cortes et al. (2009)). NLMKL (p=1) and NLMKL (p=2) apply different constraints on the feasible set. LMKL denotes the localized MKL classification methods of (Gönen et al. (2008)), where the two variations LMKL (softmax) and LMKL (sigmoid) are described.

FIG. 3 depicts the results of a Protein Folding classification task with respect to the aforementioned 16 MKL classification methods and 2 SVM classification methods. The initial Protein Folding prediction database consisted of 694 data points, partitioned to a trained set of 311 instances and a testing set of 383 instances. The goal in this classification task is to predict to which of the two major structural classes a given protein belongs to.

It should be appreciated that the classification method implementing the NNR program 101 outperforms all of the other MKL variations (85.2 Test Accuracy). Furthermore, a relatively low percentage of points were used as support vectors, less than half of the points used by the second-best classification method. Moreover, the classification method implementing the NNR program 101 was one of the fastest MKL classification methods in terms of the number of calls to the internal SVM solver.

FIG. 4 depicts the results of an Internet Advertisement classification task with respect to the aforementioned 16 MKL classification methods and 2 SVM classification methods. The initial Internet Advertisement consisted of 3,279 labeled images. Additionally, the database included five different feature representations, each consisting of a different bag of words, with dimensions ranging from 19 to 495. The goal in this classification task is to successfully identify whether a given image is an advertisement or not. It should be appreciated that the classification method implementing the NNR program 101 achieved superior performance over the aforementioned MKL variations. The fraction of data points used as support vector was extremely low, and was within less than a half standard deviation of the classification method with the lowest number of support vectors.

FIG. 5 depicts the results of a few state-of-the-art Deep Neural Networks classification task. Here, classification was performed by extracting the features from the last fully connected layer, generating a linear kernel, and using an SVM classifier. The performance of the classification method implementing the NNR program 101 was tested on three kernels, corresponding to a set of three extracted features sets. It should be appreciated that the performance of the classification method implementing the NNR program 101 shows about a 4%-6% improvement over the classification results of a linear SVM classifier based on a single deep neural networks features.

Additionally, the performance of the classification method implementing the NNR program 101 was analyzed under noisy conditions. The networks CNN-M, CNN-M2048, and CNN-M4096 are minor variations of CNN-M128, and the latter's kernel was included in the kernel set of NuC-MKL (3) classification method. It should be appreciated that the performance of the classification method implementing the NNR program 101 does not deteriorate in the presence of redundant information. Thus, the classification method implementing the NNR program 101 is disinclined to overfitting in such scenarios.

Figure 6:
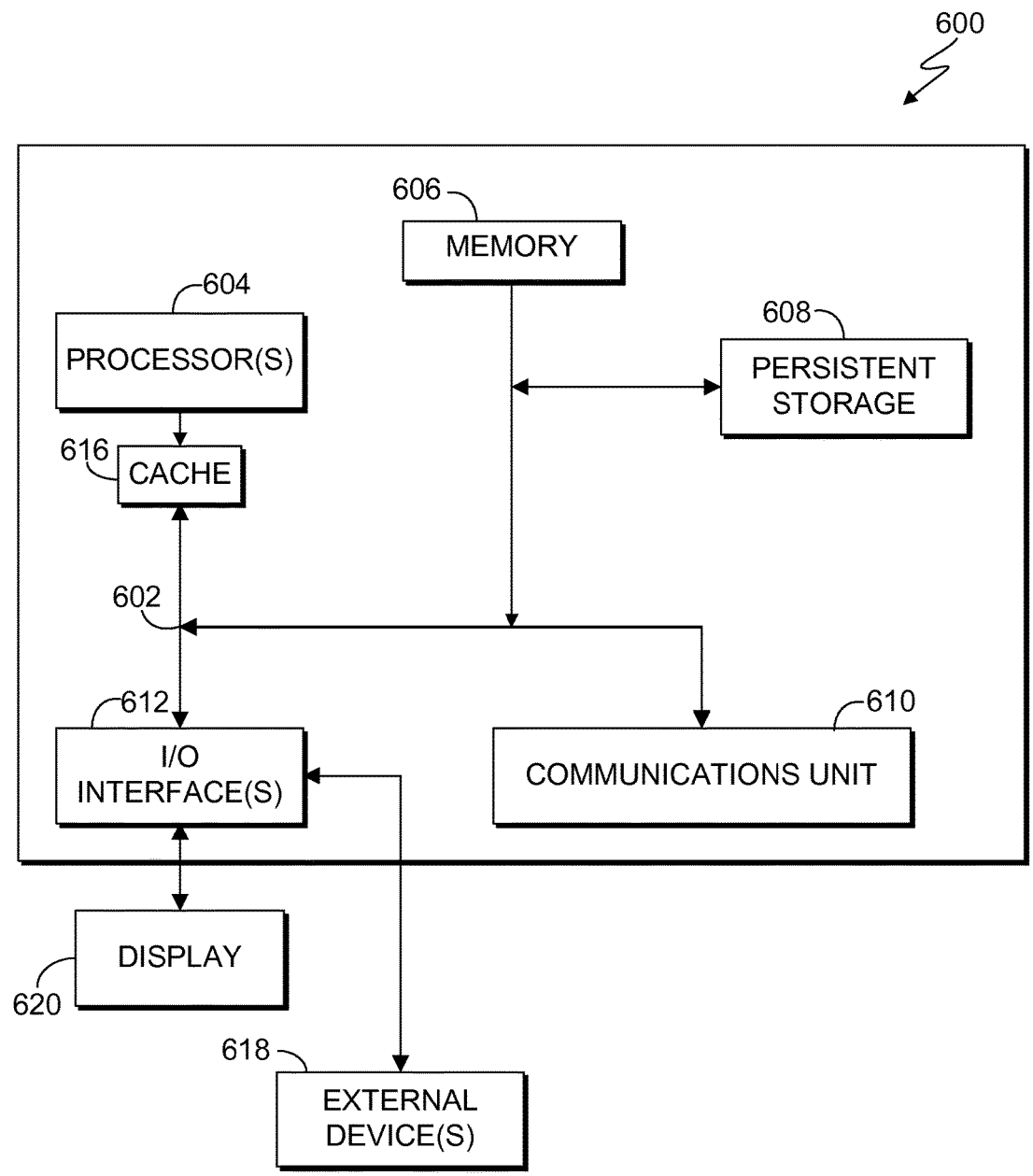
FIG. 6 is a block diagram of one example of a computing apparatus suitable for executing the problem determination program in accordance with at least one embodiment of the invention.

FIG. 6 is a block diagram depicting components of a computer 600 suitable for executing the NNR Program 101. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g. microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the NNR program 101 may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The NNR program 101 may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of reducing computer processing overhead during classification of data objects, comprising:
    receiving multimodal data for a multiple kernel learning optimization problem, wherein a number of parameters is quadratic with respect to a number of kernels;
    generating a plurality of kernel matrices from the multimodal data;
    generating an equivalent kernel matrix using the plurality of kernel matrices and a plurality of coefficient matrices, wherein: (i) each coefficient matrix in the plurality of coefficient matrices is constrained by a nuclear norm having a value greater than zero and less than or equal to one and (ii) a function of the plurality of coefficient matrices of the equivalent kernel matrix is convex;
    initiating one or more iterative processes, wherein each iterative process includes:
        calculating, based on a training set, an error for the plurality of coefficient matrices of the equivalent kernel matrix; and
        initiating a line search for the plurality of coefficient matrices of the equivalent kernel matrix;
    responsive to generating an optimal coefficient matrix, wherein the error for the plurality of coefficient matrices of the equivalent kernel matrix has been satisfied, terminating the one or more iterative processes; and
    classifying the multimodal data based, at least in part, on the equivalent kernel matrix and the optimal coefficient matrix.

2. The computer-implemented method of claim 1, wherein the equivalent kernel matrix is a linear sum of products of the plurality of kernel matrices and the plurality of coefficient matrices.

3. The computer-implemented method of claim 1, wherein the error is a separation measure of the training set and is a function of the plurality of coefficient matrices of the equivalent kernel matrix.

4. The computer-implemented method of claim 1, wherein the line search includes gradient descent.

5. The computer-implemented method of claim 1, wherein the error is calculated using support vector machine software.

6. A computer program product for reducing computer processing overhead during classification of data objects, the computer program product comprising:
one or more computer readable storage media and program instructions stored on the one or more computer readable storage media, the program instructions comprising instructions to:
receive multimodal data for a multiple kernel learning optimization problem, wherein a number of parameters is quadratic with respect to a number of kernels;
generate a plurality of kernel matrices from the multimodal data;
generate an equivalent kernel matrix using the plurality of kernel matrices and a plurality of coefficient matrices, wherein: (i) each coefficient matrix in the plurality of coefficient matrices is constrained by a nuclear norm having a value greater than zero and less than or equal to one and (ii) a function of the plurality of coefficient matrices of the equivalent kernel matrix is convex;
initiate one or more iterative processes, wherein each iterative process includes instructions to:
calculate, based on a training set, an error for the plurality of coefficient matrices of the equivalent kernel matrix; and
initiate a line search for the plurality of coefficient matrices of the equivalent kernel matrix;
responsive to generating an optimal coefficient matrix, wherein the error for the plurality of coefficient matrices of the equivalent kernel matrix has been satisfied, terminate the one or more iterative processes; and
classify the multimodal data based, at least in part, on the equivalent kernel matrix and the optimal coefficient matrix.

7. The computer program product of claim 6, wherein the equivalent kernel matrix is a linear sum of products of the plurality of kernel matrices and the plurality of coefficient matrices.

8. The computer program product of claim 6, wherein the error is a separation measure of the training set and is a function of the plurality of coefficient matrices of the equivalent kernel matrix.

9. The computer program product of claim 6, wherein the line search includes gradient descent.

10. The computer program product of claim 6, wherein the error is calculated using support vector machine software.

11. A computer system for reducing computer processing overhead during classification of data objects, the computer system comprising:
one or more computer processors;
one or more computer readable storage media;
computer program instructions;
the computer program instructions being stored on the one or more computer readable storage media;
the computer program instructions comprising instructions to:
receive multimodal data for a multiple kernel learning optimization problem, wherein a number of parameters is quadratic with respect to a number of kernels;
generate a plurality of kernel matrices from the multimodal data;
generate an equivalent kernel matrix using the plurality of kernel matrices and a plurality of coefficient matrices, wherein: (i) each coefficient matrix in the plurality of coefficient matrices is constrained by a nuclear norm having a value greater than zero and less than or equal to one and (ii) a function of the plurality of coefficient matrices of the equivalent kernel matrix is convex;
initiate one or more iterative processes, wherein each iterative process includes instructions to:
calculate, based on a training set, an error for the plurality of coefficient matrices of the equivalent kernel matrix; and
initiate a line search for the plurality of coefficient matrices of the equivalent kernel matrix;
responsive to generating an optimal coefficient matrix, wherein the error for the plurality of coefficient matrices of the equivalent kernel matrix has been satisfied, terminate the one or more iterative processes; and
classify the multimodal data based, at least in part, on the equivalent kernel matrix and the optimal coefficient matrix.

12. The computer system of claim 11, wherein the equivalent kernel matrix is a linear sum of products of the plurality of kernel matrices and the plurality of coefficient matrices.

13. The computer system of claim 11, wherein the error is a separation measure of the training set and is a function of the plurality of coefficient matrices of the equivalent kernel matrix.

14. The computer system of claim 11, wherein the line search includes gradient descent.

* * * * *